United States Patent
Deschler et al.

(10) Patent No.: US 8,805,891 B2
(45) Date of Patent: Aug. 12, 2014

(54) B-TREE ORDINAL APPROXIMATION

(75) Inventors: Kurt Deschler, Marborough, MA (US); Steven A. Kirk, Chelmsford, MA (US)

(73) Assignee: Sybase, Inc., Dublin, CA (US)

( * ) Notice: Subject to any disclaimer, the term of this patent is extended or adjusted under 35 U.S.C. 154(b) by 333 days.

(21) Appl. No.: 12/749,361

(22) Filed: Mar. 29, 2010

(65) Prior Publication Data

US 2011/0238667 A1      Sep. 29, 2011

(51) Int. Cl.
*G06F 17/30*      (2006.01)

(52) U.S. Cl.
CPC .............................. *G06F 17/30327* (2013.01)
USPC ...................................................... 707/802

(58) Field of Classification Search
USPC .......................... 707/741, 764, 802
See application file for complete search history.

(56) References Cited

U.S. PATENT DOCUMENTS

| | | | |
|---|---|---|---|
| 7,499,912 B2* | 3/2009 | Hershkovich et al. | 1/1 |
| 2002/0107860 A1* | 8/2002 | Gobeille et al. | 707/101 |
| 2004/0221229 A1* | 11/2004 | Perry | 715/514 |
| 2008/0071764 A1* | 3/2008 | Omi et al. | 707/5 |
| 2010/0011011 A1* | 1/2010 | Lemar et al. | 707/100 |

* cited by examiner

*Primary Examiner* — Joshua Bullock
(74) *Attorney, Agent, or Firm* — Sterne, Kessler, Goldstein & Fox P.L.L.C.

(57) ABSTRACT

A system, method, and computer program product are provided for generating a range of ordinals corresponding to key values represented in a B-Tree data structure. This allows for a boundary point, usable, for example, for partitioning the B-Tree for parallel processing, to be specified using an ordinal value of the range of ordinals. Then an ordinal-to-key transformation can be performed in order to identify a key value corresponding to the boundary point. Additionally, ordinal values can be identified through the use of key-to-ordinal transformations, allowing for specification of ranges, for example, in terms of key values.

21 Claims, 6 Drawing Sheets

B-TREE ORDINAL APPROXIMATION

BACKGROUND OF INVENTION

1. Field of the Invention

The present invention relates generally to databases and, more specifically, to parallel processing of data from databases.

2. Description of the Background Art

In many database systems, key-value lookups are performed through the use of B-Tree data structures. A B-Tree is an ordered data structure, with groupings of data at leaf nodes typically corresponding to a memory page in the database context. Under typical usage in a database, a B-Tree will serve as a tool for sorting the key-values in groupings corresponding to memory page size limits.

When performing database operations on data corresponding to a set of key-values, it is beneficial to allow multiple processors to resolve the operations in parallel when possible. This typically involves splitting the data in the B-Tree into two or more sets of data, for each processor or processor core to operate on. However, the techniques for splitting this data remain rudimentary at best, and do not realize the significant advantages that can be obtained through proper partitioning.

Accordingly, what is desired are techniques to improve parallelization of data sets represented by a B-Tree data structure.

SUMMARY OF INVENTION

Embodiments of the invention include a method comprising generating a range of ordinals corresponding to key values represented in a B-Tree data structure, specifying a boundary point using an ordinal value of the range of ordinals, and performing an ordinal-to-key transformation to identify a key value corresponding to the boundary point.

Embodiments of the invention additionally include a computer-readable medium having computer-executable instructions stored thereon that, if executed by a computing device, cause the computing device to perform a method comprising generating a range of ordinals corresponding to key values represented in a B-Tree data structure, specifying a boundary point using an ordinal value of the range of ordinals, and performing an ordinal-to-key transformation to identify a key value corresponding to the boundary point.

Embodiments of the invention further include a system comprising a memory configured to store modules comprising a generating module configured to generate a range of ordinals corresponding to key values represented in a B-Tree data structure, a specifying module configured to specify a boundary point using an ordinal value of the range of ordinals, and a performing module configured to perform an ordinal-to-key transformation to identify a key value corresponding to the boundary point, and one or more processors configured to process the modules.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the relevant art to make and use the invention.

Figure 1:
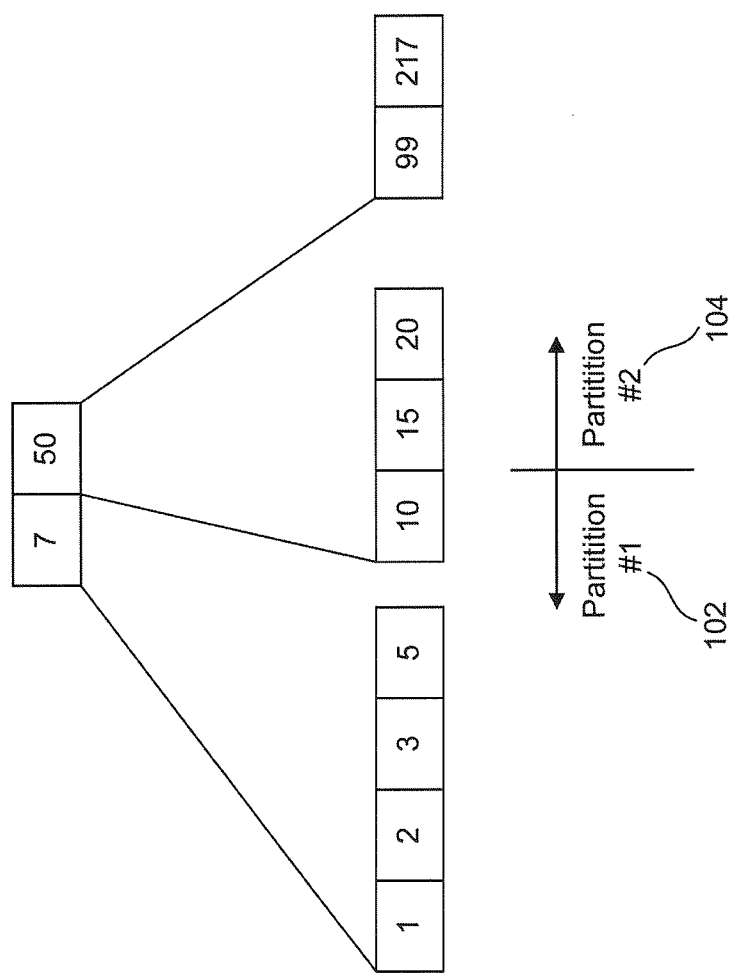
FIG. 1 is an exemplary B-Tree illustrating key-values of a database table, in accordance with an embodiment of the present invention.

The present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

I. Introduction

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

It would be apparent to one of skill in the art that the present invention, as described below, can be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, and within the scope and spirit of the present invention.

FIG. 1 is an exemplary B-Tree 100 illustrating key-values of a database table, in accordance with an embodiment of the present invention. B-Tree 100 contains the set of ordered keys {1, 2, 3, 5, 7, 10, 15, 20, 50, 99, 217}. The particular arrangement of nodes shown in B-Tree 100 is just one exemplary arrangement, and one skilled in the relevant arts will appreciate that other arrangements of B-Trees, for the same or other ordered keys, may be utilized.

This exemplary B-Tree arrangement allows for rapid traversal in order to locate data being requested. For example, a range search operation for key values between 2 and 16, inclusive, would begin at the root node, recursively traverse to the left child, identify the child nodes greater-than-or-equal to 2, return to the root node, and traverse to the middle child to identify the remaining child nodes less-than-or-equal-to 16. The fact that a B-Tree is an ordered data structure that facilitates this type of traversal makes this operation fairly efficient.

It would be beneficial to optimize this kind of work for multi-processor or multi-core systems. One skilled in the relevant arts will recognize that references to processors or cores throughout are interchangeable for the purposes of this disclosure. Normally, improvement or optimization for multi-processor systems is accomplished by partitioning the B-Tree into two or more partitions based on the number of processors available. However, a traditional B-Tree implementation does not have enough information in order to determine partition boundaries effectively. Knuth describes a variant ranked B-Tree index where each interior page of the B-Tree stores counts of items within a given subtree, providing enough information to determine exactly-sized partition boundaries while recursively navigating the interior pages of the B-Tree structure. (Knuth, Donald. The Art of Computer Programming, Volume 3: Sorting and Searching. Second Edition Addison-Wesley, 1998).

The effort required by the Knuth solution to maintain ordinal values at each interior page results in significant inefficiencies, particularly when the B-Tree is dynamic in nature. Moreover, developer-specified partition points based on key values suffer from inflexibility, particularly as a developer may not have a complete or consistent picture of the data being represented by the B-Tree data structure. The B-Tree 100 of FIG. 1 shows an exemplary partition, as might be specified by a developer, dividing the data set in half. The exemplary partition creates two disjoint sets of key values, such that partition #1 102 contains key values {1, 2, 3, 5, 7, 10} and partition #2 104 contains key values {15, 20, 50, 99, 217}. Using this partitioning, the earlier range search example for key values between 2 and 16, inclusive, could be performed in parallel. Notably, however, in this exemplary partition scheme, most of the processing would be handled by the processor responsible for partition #1 102, with disproportionately less processing dedicated to the processor responsible for partition #2 104.

Another flaw of the developer-specified partitioning scheme is that it relies on data types (e.g., integers) that are readily used as partitions based on their values. A better scheme is therefore proposed that allows for partitioning based on any data type at runtime.

II. Runtime Partitioning

In comparison to a ranked B-Tree, such as the Knuth ranked B-tree, embodiments of the present invention are able to partition a B-Tree with less partitioning work as a whole, as well as less serialized work that could represent a bottleneck in a parallel system. Where, in typical operation, partitioning a ranked B-Tree would require reading all of the interior pages during partitioning steps, an embodiment of the present invention requires no I/O during partitioning steps, such that almost all of the partitioning and processing work can be performed in parallel. At a minimum, there are significant inefficiencies associated with a ranked B-Tree due to the need to constantly maintain the data at each interior page.

In accordance with an embodiment of the present invention, the proposed systems and methods apply to a B-Tree index structure that has been constructed and populated with data, and will remain invariant during the course of partitioning computations. By applying the proposed methods and systems to such a B-Tree, it is possible to perform a function in parallel over a contiguous set of keys in the B-Tree, in accordance with an embodiment of the present invention.

Figure 2:
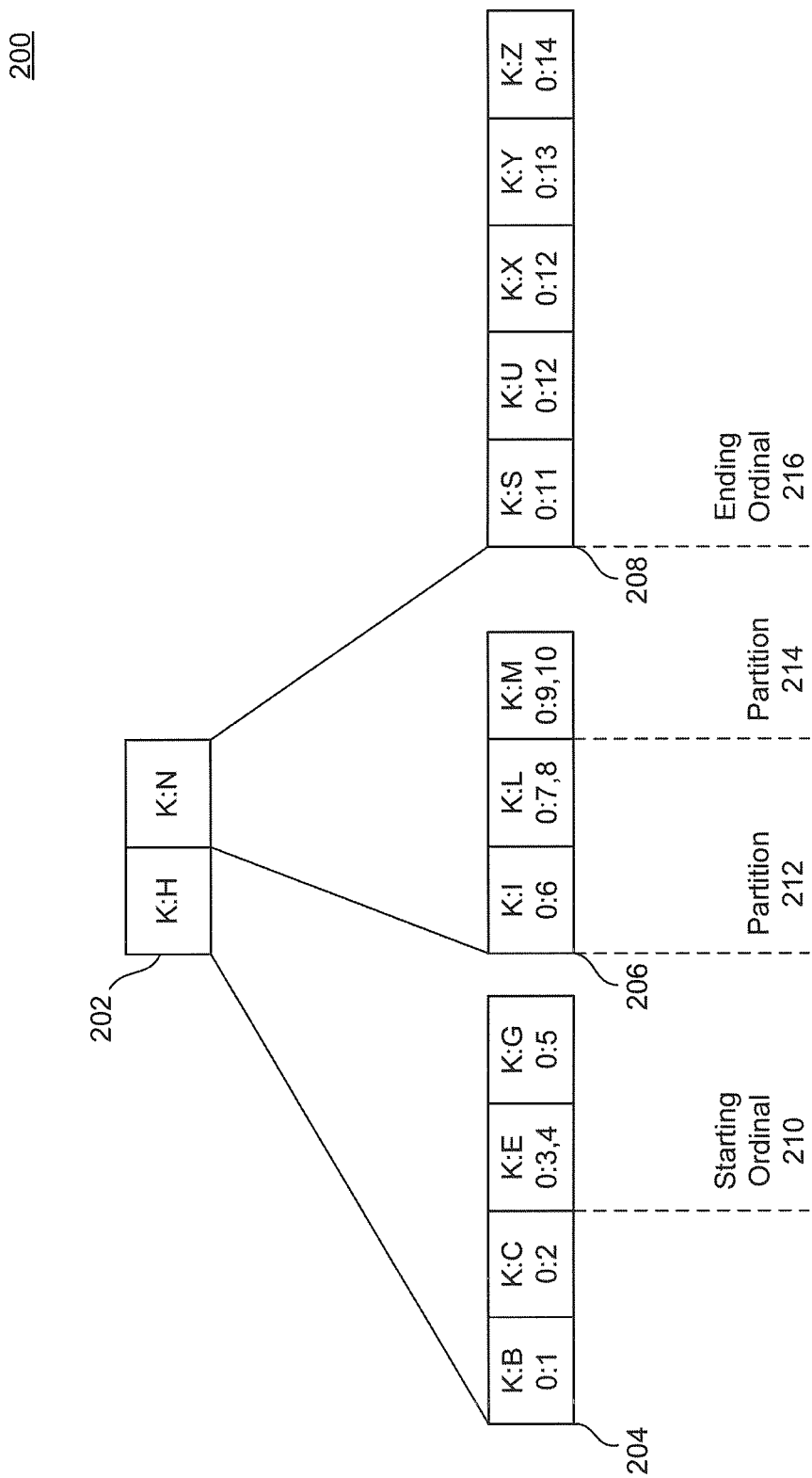
FIG. 2 is an exemplary B-Tree index structure, in accordance with an embodiment of the present invention.

FIG. 2 is an exemplary B-Tree 200 index structure, in accordance with an embodiment of the present invention. B-Tree 200 comprises key values of the set {B, C, E, G, H, I, L, M, N, S, U, X, Y, Z}, in the non-limiting example shown in FIG. 2. These key values are ordered within B-Tree 200 such that page 204 comprises key values that are logically less-than key value H within root page 202. Similarly, page 206 comprises key values that are logically greater-than key value H but less-than key value N, while page 208 comprises key values that are greater-than key value N. Continued reference will be made to FIG. 2 throughout in order to clarify embodiments of the present invention, with further elements of FIG. 2 described as necessary.

Figure 3:
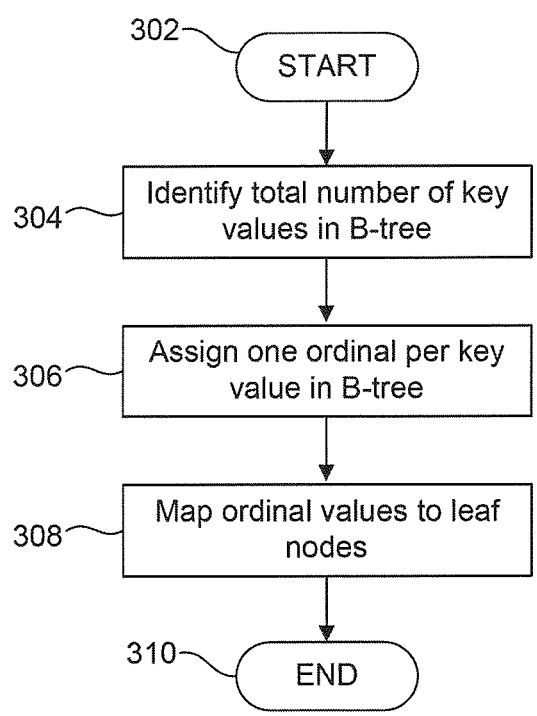
FIG. 3 is a flowchart illustrating general steps for partitioning a B-Tree, in accordance with an embodiment of the present invention.

FIG. 3 is a flowchart 300 illustrating general steps for partitioning a B-Tree, such as B-Tree 200, in accordance with an embodiment of the present invention. The method begins at step 302 and proceeds to step 304 where the total number of key values in the B-Tree is identified. In accordance with an embodiment of the present invention, the total number of entries for the entire B-Tree is tracked along with any updates (e.g., insertions, deletions, etc.) to the B-Tree. This total number of entries correlates to a quantity of ordinals to be used in a mapping to key values of the B-Tree, at step 306, such that if there are 30 entries in the B-Tree, then 30 ordinals (e.g., 1 through 30) are assigned for mapping to the B-Tree.

At step 308, the selected ordinals are mapped to leaf nodes of the B-Tree, in accordance with an embodiment of the present invention. The precise methodology used to accomplish this mapping will be discussed in further detail below. It is noted that this mapping exists only as a function initially, in accordance with an embodiment of the present invention, with ordinals being computed when partitioning occurs during runtime, as will be further discussed below. The method then ends at step 310.

Rather than having a set of ordinals rigidly assigned for a B-Tree, the techniques described herein assign ordinals using an approximation, due to the potential for imbalances in the B-Tree, in accordance with an embodiment of the present invention. The use of ordinals allows for the specifying of parallel processing partitions in terms of an ordinal. For example, in a B-Tree with 14 entries, 14 ordinals are assigned, and the B-Tree can be partitioned two ways by specifying a partition point of '8' as the first ordinal corresponding to the second partition. This approach can be used for any number of ordinals, number of partitions to be used (less than or equal to the number of entries in the B-Tree), as well as ranges of ordinal values under consideration, as will be understood by one skilled in the relevant arts.

III. Transformation Algorithms

In order to utilize the approximated ordinals in a number of parallelization tasks, two transformation algorithms are defined: ordinal-to-key and key-to-ordinal. These transformations allow the ordinals to be used to partition the B-Tree into discrete ranges of key sets, in accordance with an embodiment of the present invention. These algorithms are reflexive in nature, such that rules implied by each can be enforced on a value output by the other.

The following rule holds for key-to-ordinal transformations:

For any approximate ordinals O1 and O2, where the numeric value of O1 is less than O2, the key K1 mapped to O1 will be less than or equal to the key K2 mapped by O2, such that $(O1 < O2) \rightarrow (K1 <= K2)$.

The following rule holds for ordinal-to-key transformations:

For any keys K1 and K2, where the key value of K1 is less than K2, the approximate ordinal O1 mapped to K1 will be less than or equal to the approximate ordinal O2 mapped by K2, such that (K1<K2)→(O1<=O2).

The evaluation of the key-to-ordinal and ordinal-to-key computations, as shown below, is performed recursively. At each non-leaf level of the B-Tree, approximations of the number of values in a particular sub tree determine a range of approximate ordinals to assign to that sub tree. For example, in B-Tree 200 of FIG. 2, it is known that there are 14 entries in B-Tree 200, including root page 202. It is also known, while at root page 202, that there are three child pages, 204, 206, and 208. Because 14 is not evenly divisible by 3, the child pages are each assigned 5, 5, and 4 ordinal values, respectively, in accordance with an embodiment of the present invention. Each child page would similarly distribute the number of ordinals assigned to it among its own child pages, recursively, or assign the ordinals to its nodes if it is a leaf.

Mapping ordinal values at the leaf level, as in step 308 of FIG. 3, is accomplished through the use of the following transformation, which guarantees the aforementioned reflexive relationships between ordinals and key values, by similarly guaranteeing a reflexive relationship between approximate ordinal numbers and indices within the leaf page, in accordance with an embodiment of the present invention.

Several preconditions are assumed for the mapping. The term "index" refers to a 0-based ordinal entry position on a given page, such as pages 204, 206, and 208 of FIG. 2, in accordance with an embodiment of the present invention. The term "num_node" represents the total number of entries on the page, and the term "num_ordinal" represents the number of ordinals to allocate to the page. For example, in page 206, there are three entries in the page corresponding to key values {I, L, M}. Key value "I" corresponds to index 0, whereas key values "L" and "M" correspond to indexes 1 and 2, respectively. The value for "num_node" is 3 in this case, given that there are three entries in the page. The value for "num_ordinal" may be given as 5, for example, given the earlier discussed allocation of 14 ordinals, although one skilled in the relevant arts will recognize that the number of ordinals assigned to this page, all other characteristics of this page being constant, may vary with the size of the rest of B-Tree 200.

The following formulas are then used to compute estimated ordinals, and an index from an ordinal value, in accordance with an embodiment of the present invention. Index-to-ordinal transformation is computed as follows:

$$ordinal=((index*num\_ordinal)/(num\_node))$$

The reflexive formula for calculating ordinal-to-index transformation is computed as follows:

$$index=((ordinal*num\_node+num\_node-1)/num\_ordinal)$$

These formulas are applied at the leaf page level when performing ordinal-to-key and key-to-ordinal transformations, described below. It is further noted that the aforementioned formulas are for application to integer data, and include rounding appropriate to integer types that would not be used, in accordance with an embodiment of the present invention.

IV. Ordinal-to-Key Transformation

Figure 4:
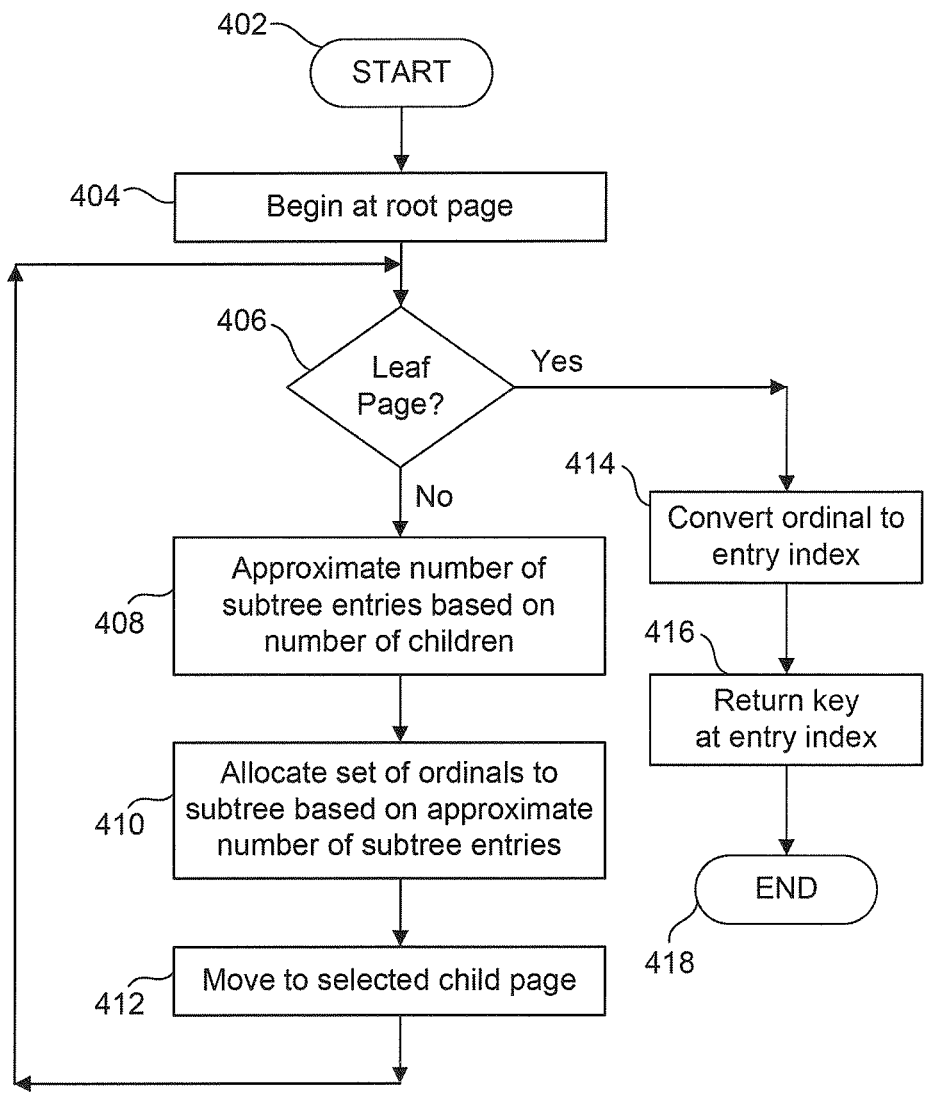
FIG. 4 is a flowchart illustrating steps by which an ordinal-to-key transformation is performed, in accordance with an embodiment of the present invention.

FIG. 4 is a flowchart 400 illustrating steps by which an ordinal-to-key transformation is performed, in accordance with an embodiment of the present invention. An ordinal-to-key transformation allows for the specification of for example, bounds defining start and end points, such as starting ordinal 210 and ending ordinal 216 of FIG. 2. Likewise, partition points, such as partition 212 and partition 214, can be specified in terms of ordinal values. For example, if it is desired to evenly partition a B-Tree for parallel processing, a range of ordinals can be evenly divided in a manner that allows assignment of a range of ordinals to a particular processor, rather than relying on inefficient key value-based partitioning.

The method begins at step 402 and proceeds to step 404 where processing begins at a root page, such as page 202 of FIG. 2, in accordance with an embodiment of the present invention. At step 406, a determination is made as to whether the current page is a leaf page. If not, as would be the case with root page 202, the method proceeds to step 408.

At step 408, an approximate number of subtree entries is determined based on the number of child pages, in accordance with an embodiment of the present invention. This calculation is based on initial knowledge, at the root level, of the total number of entries in the B-Tree. For example, the equation:

$$subtree\_entries=subtree\_entries/num\_children$$

determines an approximate number of entries for each subtree, in accordance with an embodiment of the present invention. Although one skilled in the relevant arts will appreciate that other approximation methodologies may be used, the given approximation methodology is provided by way of example, and not limitation. The given approximation works best for a mostly balanced B-Tree, but other techniques may be used for other general cases.

By applying the above formula to the example B-Tree 200 of FIG. 2 at the root level 202, the 14 entries corresponding to the subtree beginning at page 202 (i.e., the subtree corresponding to the entire B-Tree) are allocated among three children, so 14/3=4.67. This approximation means that each child page is expected to have approximately 4.67 nodes within it.

At step 410, a set of ordinals is allocated to each subtree based on the approximated number of subtree entries, in accordance with an embodiment of the present invention. This is accomplished by the equations:

$$index=ordinal/subtree\_entries$$

$$ordinal=ordinal-(index*subtree\_entries)$$

At step 412, the method recurses to the child page corresponding to the index value, and begins anew at step 406. However, in a subsequent pass, the method determines at step 406 that the leaf page has been reached. Here, the previously described ordinal-to-index transformation is applied at step 414 in order to determine which entry within the leaf page, based on its index, corresponds to the ordinal value. Then, at step 416, the key corresponding to this index is returned, and the method ends at step 418.

With a key value obtained from the ordinal-to-key transformation, the B-Tree can be traversed in search for the key value, in accordance with an embodiment of the present invention. For example, in FIG. 2, with starting ordinal "3" 210 and ending ordinal "12" 216 specified, and partitions specified at ordinals "6" for partition 212 and "9" for partition 214, the corresponding key values can be determined. This allows processing on, for example, key values "E" through "H" on one processor, "I" through "N" on another, etc. It is the initial ability to specify these partitions and ranges in terms of ordinals that provides this flexibility.

V. Key-to-Ordinal Transformation

Sometimes, prior to partitioning on ordinal values for example, it is useful to specify information in terms of key values. For example, a bounding range for a database query will likely be specified in the form of key values, rather than corresponding ordinal values. In the example B-Tree 200 of FIG. 2, the starting and ending ordinals 210, 216 might instead be specified first in terms of key value bounds, such as a JOIN operation on all entries with key values between E and S, inclusive.

Accordingly, when such specification is made in terms of key values, it is useful to convert first to ordinals in order to provide sufficient information for, for example, partitioning the data set for parallel computation, in accordance with an embodiment of the present invention. In the example B-Tree 200, although it is known a priori that there are 14 entries total, it is not inherently known how many entries are in the range of key values between E and S, inclusive. Thus, conversion first to ordinals of these key values provides approximate information useful in proper partitioning of the data set.

Figure 5:
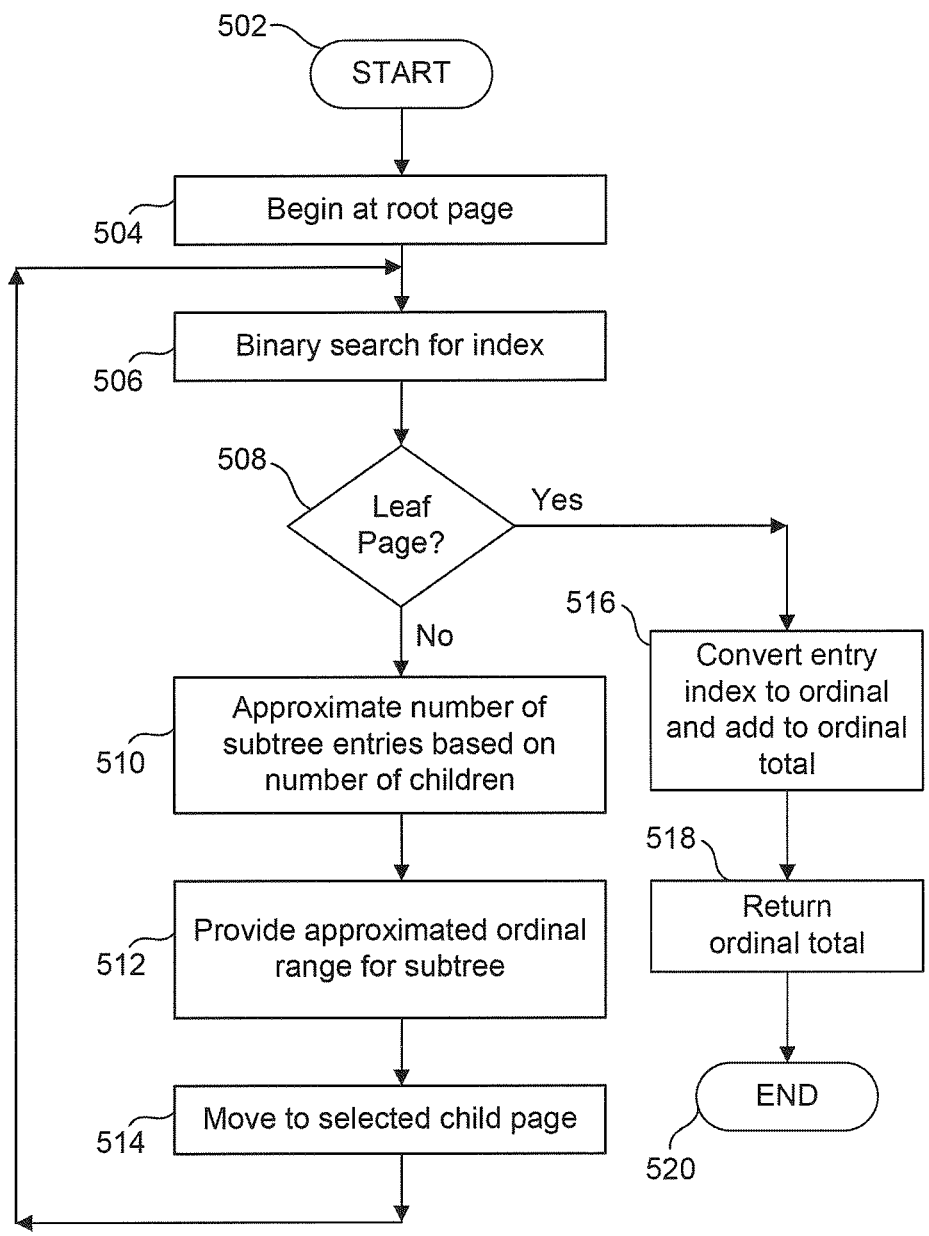
FIG. 5 is a flowchart illustrating steps for performing the key-to-ordinal transformation, in accordance with an embodiment of the present invention.

FIG. 5 is a flowchart 500 illustrating steps for performing the key-to-ordinal transformation, in accordance with an embodiment of the present invention. The method begins at step 502 and proceeds to step 504 where processing begins at a root page, such as page 202 of FIG. 2, in accordance with an embodiment of the present invention.

At step 506, a binary search is conducted in order to identify an index for the key being searched, in accordance with an embodiment of the present invention. If the key being searched is in a child page, for example, this step identifies which child page to proceed down. However, if the key being searched is in the current page, this step identifies the index of that key within the current page. At step 508, a determination is made as to whether the current page is a leaf page, and if not, processing continues with step 510.

At step 510, an approximate number of subtree entries is determined based on the number of child pages, in accordance with an embodiment of the present invention. This calculation is based on initial knowledge, at the root level, of the total number of entries in the B-Tree, as before with the ordinal-to-key transformation. For example, the equation:

subtree_entries=subtree_entries/num_children determines an approximate number of entries for each subtree, in accordance with an embodiment of the present invention. Although one skilled in the relevant arts will appreciate that other approximation methodologies may be used, the given approximation methodology is provided by way of example, and not limitation. The given approximation works best for a mostly balanced B-Tree, but other techniques may be used for other general cases.

At step 512, the approximated ordinal range for a particular subtree is determined, in accordance with an embodiment of the present invention. This selected subtree corresponds to the subtree expected to contain the key value being searched, based on the results of the binary search at step 506, in accordance with an embodiment of the present invention. The formula for determining the ordinal range (i.e., the lowest value ordinal corresponding to the child page of the selected subtree) is given by:

outOrdinal=outOrdinal+((index+1)*subtree_entries)

At step 514, the method recurses to the selected child page corresponding to the selected subtree, and the method begins anew at step 506. During a subsequent iteration, however, the selected child page is a leaf page, so the determination at step 508 diverges to step 516, where the index determined at step 506 is converted into an ordinal, in accordance with an embodiment of the present invention. This conversion is accomplished using the earlier described index-to-ordinal transformation. At step 518, the ordinal value is returned, and the method ends at step 520.

An additional usage of key-to-ordinal transformation is as a means for estimating a number of entries between two key values, in accordance with an embodiment of the present invention. For example, based on the B-Tree 200 of FIG. 2, a key-to-ordinal transformation of keys 'E' and 'S' provides ordinal values of '3' (or possibly '4') and '11', respectively. By subtracting 3 or 4 from 11, in this non-limiting example, it can be determined that there are approximately 7 or 8 key values between 'E' and 'S', which turns out to be a close approximation for the exemplary B-Tree 200 of FIG. 2. This technique is useful, for example, in determining the number of values within a range that are available for partitioning. One skilled in the relevant arts will appreciate that other applications of this technique are possible, and the aforementioned usage is provided by way of example, and not limitation.

VI. Example Computer System Implementation

Figure 6:
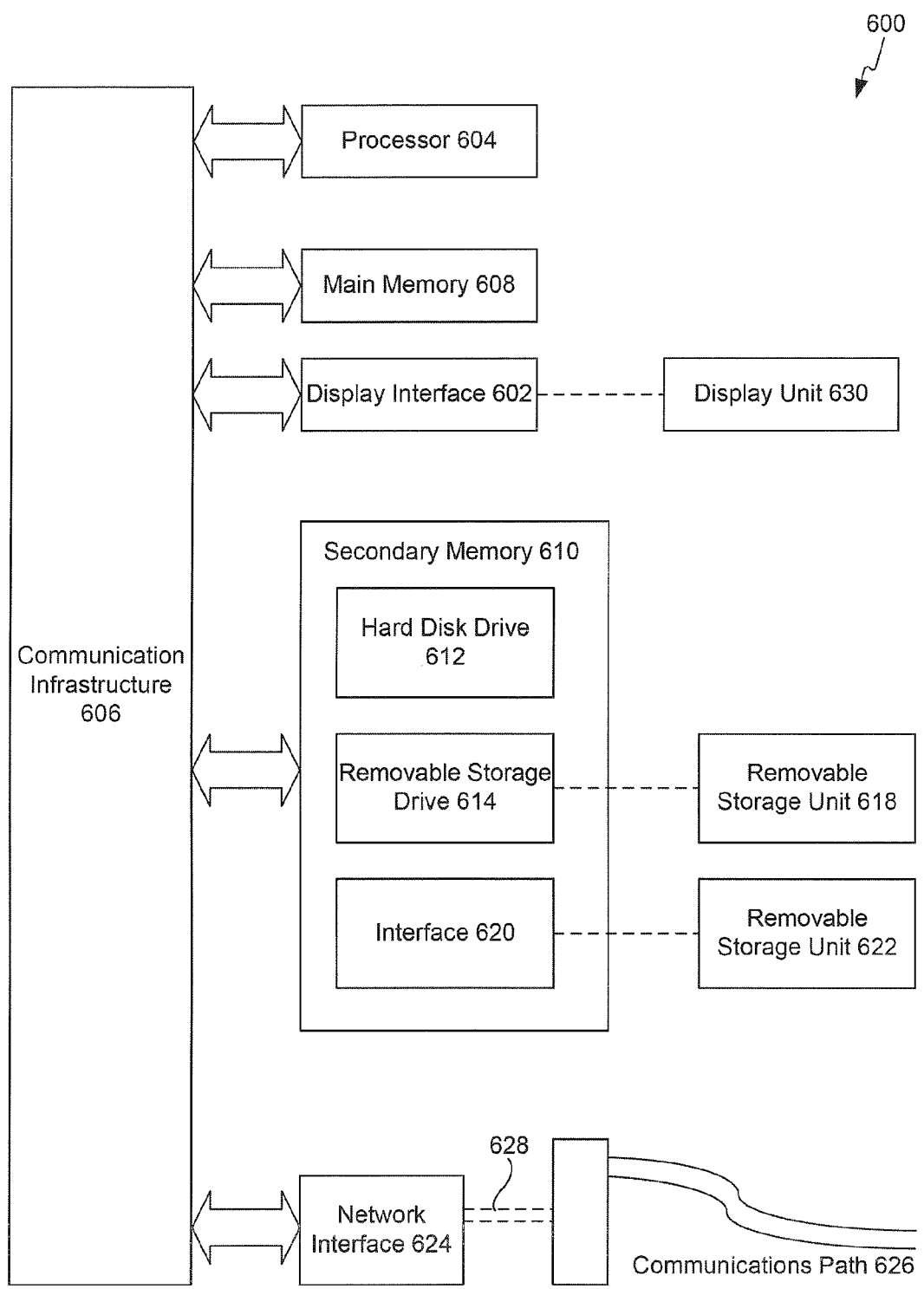
FIG. 6 depicts an example computer system in which embodiments of the present invention may be implemented.

Various aspects of the present invention can be implemented by software, firmware, hardware, or a combination thereof. FIG. 6 illustrates an example computer system 600 in which the present invention, or portions thereof, can be implemented as computer-readable code. For example, the methods illustrated by flowcharts 300 of FIG. 3, 400 of FIG. 4, and 500 of FIG. 5, can be implemented in system 600. Various embodiments of the invention are described in terms of this example computer system 600. After reading this description, it will become apparent to a person skilled in the relevant art how to implement the invention using other computer systems and/or computer architectures.

Computer system 600 includes one or more processors, such as processor 604. Processor 604 can be a special purpose or a general purpose processor. Processor 604 is connected to a communication infrastructure 606 (for example, a bus or network).

Computer system 600 also includes a main memory 608, preferably random access memory (RAM), and may also include a secondary memory 610. Secondary memory 610 may include, for example, a hard disk drive 612, a removable storage drive 614, and/or a memory stick. Removable storage drive 614 may comprise a floppy disk drive, a magnetic tape drive, an optical disk drive, a flash memory, or the like. The removable storage drive 614 reads from and/or writes to a removable storage unit 618 in a well known manner. Removable storage unit 618 may comprise a floppy disk, magnetic tape, optical disk, etc. that is read by and written to by removable storage drive 614. As will be appreciated by persons skilled in the relevant art(s), removable storage unit 618 includes a computer usable storage medium having stored therein computer software and/or data.

In alternative implementations, secondary memory 610 may include other similar means for allowing computer programs or other instructions to be loaded into computer system 600. Such means may include, for example, a removable storage unit 622 and an interface 620. Examples of such means may include a program cartridge and cartridge interface (such as that found in video game devices), a removable memory chip (such as an EPROM, or PROM) and associated socket, and other removable storage units 622 and interfaces 620 that allow software and data to be transferred from the removable storage unit 622 to computer system 600.

Computer system 600 may also include a communications interface 624. Communications interface 624 allows software and data to be transferred between computer system 600 and external devices. Communications interface 624 may include a modem, a network interface (such as an Ethernet card), a communications port, a PCMCIA slot and card, or the like. Software and data transferred via communications interface 624 are in the form of signals that may be electronic, electromagnetic, optical, or other signals capable of being received by communications interface 624. These signals are provided to communications interface 624 via a communications path 626. Communications path 626 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 618, removable storage unit 622, and a hard disk installed in hard disk drive 612. Signals carried over communications path 626 can also embody the logic described herein. Computer program medium and computer usable medium can also refer to memories, such as main memory 608 and secondary memory 610, which can be memory semiconductors (e.g. DRAMs, etc.). These computer program products are means for providing software to computer system 600.

Computer programs (also called computer control logic) are stored in main memory 608 and/or secondary memory 610. Computer programs may also be received via communications interface 624. Such computer programs, when executed, enable computer system 600 to implement the present invention as discussed herein. In particular, the computer programs, when executed, enable processor 604 to implement the processes of the present invention, such as the steps in the methods illustrated by flowcharts 300 of FIG. 3, 400 of FIG. 4, and 500 of FIG. 5, discussed above. Accordingly, such computer programs represent controllers of the computer system 600. Where the invention is implemented using software, the software may be stored in a computer program product and loaded into computer system 600 using removable storage drive 614, interface 620, hard drive 612 or communications interface 624.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

VII. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method comprising:
generating a range of ordinals corresponding to key values represented in a B-Tree data structure, wherein each ordinal of the range of ordinals maps to a location of a corresponding key value within the B-Tree data structure;
specifying a partition point at which to partition the B-Tree data structure for parallel processing using an ordinal value of the range of ordinals; and
performing an ordinal-to-key transformation to identify the key value corresponding to the partition point specified using the ordinal value.

2. The method of claim 1, further comprising:
specifying a range of key values in terms of a range key value; and
performing a key-to-ordinal transformation of the range key value to identify a range ordinal value,
wherein specifying the partition point further comprises specifying the partition point within a range defined, by the range ordinal value.

3. The method of claim 2, wherein the range of key values correspond to a range operation specified in a database query.

4. The method of claim 2, wherein performing the key-to-ordinal transformation comprises:
performing a binary search in the B-Tree for the range key value;
dividing the number of subtree entries by a number of child pages branching from a current page to obtain an approximate number of child subtree entries of a child subtree; and
assigning a subset of the range of ordinals to the child subtree based on the number of child subtree entries.

5. The method of claim 4, wherein performing the key-to-ordinal transformation further comprises:
recursively performing the binary search, dividing the number of subtree entries, and assigning the subset of the range of ordinals on successive child subtrees until the current page is a leaf page;
determining an ordinal value corresponding to an index of the range key value in the leaf page; and
returning the ordinal value.

6. The method of claim 1, wherein generating the range of ordinals comprises:
determining the range of ordinals based on a determined number of subtree entries.

7. The method of claim 6, wherein the number of subtree entries is known for the B-Tree data structure and wherein the range of ordinals is equivalent to the number of subtree entries for a root page.

8. The method of claim 6, wherein performing the ordinal-to-key transformation comprises:
dividing the number of subtree entries by a number of child pages branching from a current page to obtain an approximate number of child subtree entries of a child subtree; and
assigning a subset of the range of ordinals to the child subtree based on the number of child subtree entries.

9. The method of claim 8, wherein performing the ordinal-to-key transformation further comprises:
  recursively performing dividing the number of subtree entries and assigning the subset of the range of ordinals on successive child subtrees until the current page is a leaf page;
  determining an index value in the leaf page corresponding to the ordinal value of the range of ordinals; and
  returning the key value corresponding to the index value.

10. The method of claim 1, wherein the ordinal value evenly divides the range of ordinals into two disjoint sets.

11. A computer-readable storage device having computer-executable instructions stored thereon that, if executed by a computing device, cause the computing device to perform a method comprising:
  generating a range of ordinals corresponding to key values represented in a B-Tree data structure, wherein each ordinal of the range of ordinals maps to a location of a corresponding key value within the B-Tree data structure;
  specifying a partition point at which to partition the B-Tree data structure for parallel processing using an ordinal value of the range of ordinals; and
  performing an ordinal-to-key transformation to identify the key value corresponding to the partition point specified using the ordinal value.

12. The computer-readable storage device of claim 11, the method further comprising:
  specifying a range of key values in terms of a range key value; and
  performing a key-to-ordinal transformation of the range key value to identify a range ordinal value,
  wherein specifying the partition point further comprises specifying the partition point within a range defined by the range ordinal value.

13. The computer-readable storage device of claim 12, wherein the range of key values correspond to a range operation specified in a database query.

14. The computer-readable storage device of claim 12, wherein performing the key-to-ordinal transformation comprises:
  performing a binary search in the B-Tree for the range key value;
  dividing the number of subtree entries by a number of child pages branching from a current page to obtain an, approximate number of child subtree entries of a chili subtree; and
  assigning a subset of the range of ordinals to the child subtree based on the number of child subtree entries.

15. The computer-readable storage device of claim 14, wherein performing the key-to-ordinal transformation further comprises:
  recursively performing the binary search, dividing the number of subtree entries, and assigning the subset of the range of ordinals on successive child subtrees until the current page is a leaf page;
  determining an ordinal value corresponding to an index of the range key value in the leaf page; and
  returning the ordinal value.

16. The computer-readable storage device of claim 11, wherein generating the range of ordinals comprises:
  determining the range of ordinals based on a determined number of subtree entries.

17. The computer-readable storage device of claim 16, wherein the number of subtree entries is known for the B-Tree data structure and wherein the range of ordinals is equivalent to the number of subtree entries for a root page.

18. The computer-readable storage device of claim 16, wherein performing the ordinal-to-key transformation comprises:
  dividing the number of subtree entries by a number of child pages branching from a current page to obtain an approximate number of child subtree entries of a child subtree; and
  assigning a subset of the range of ordinals to the child subtree based on the number of child subtree entries.

19. The computer-readable storage device of claim 18, wherein performing the ordinal-to-key transformation further comprises:
  recursively performing dividing the number of subtree entries and assigning the subset of the range of ordinals on successive child subtrees until the current page is a leaf page;
  determining an index value in the leaf page corresponding to the ordinal value of the range of ordinals; and
  returning the key value corresponding to the index value.

20. The computer-readable storage device of claim 11, wherein the ordinal value evenly divides the range of ordinals into two disjoint sets.

21. A system comprising:
  a memory configured to store modules comprising:
    a generating module configured to generate a range of ordinals corresponding to key values represented in a B-Tree data structure, wherein each ordinal of the range of ordinals maps to a location of a corresponding key value within the B-Tree data structure,
    a specifying module configured to specify a partition point at which to partition the B-Tree data structure for parallel processing using an ordinal value of the range of ordinals, and
    a performing module configured to perform an ordinal-to-key transformation to identify the key value corresponding to the partition point specified using the ordinal value; and
  one or more processors configured to process the modules.

* * * * *